Figure 1:
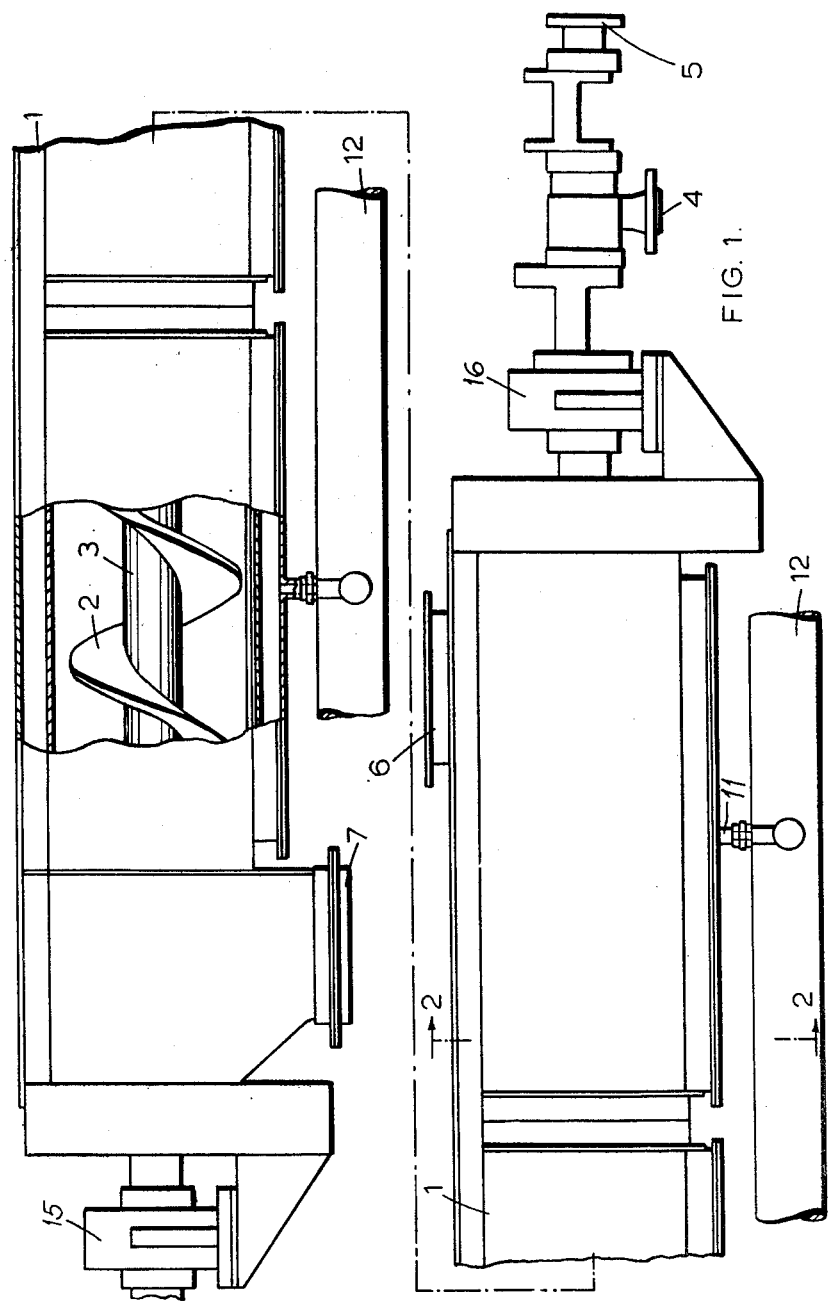

Nov. 10, 1964 C. BOULET 3,156,455
METHODS OF EFFECTING HEAT EXCHANGE AND HEAT
TRANSFER DEVICES THEREFOR
Filed Jan. 15, 1962 2 Sheets-Sheet 2

INVENTOR

CHARLES BOULET

By Irwin S. Thompson

ATTY.

United States Patent Office 3,156,455
Patented Nov. 10, 1964

3,156,455
METHODS OF EFFECTING HEAT EXCHANGE
AND HEAT TRANSFER DEVICES THEREFOR
Charles Boulet, Versailles, France, assignor to Holo-Flite International Incorporated, San Francisco, Calif.
Filed Jan. 15, 1962, Ser. No. 166,218
Claims priority, application France, Dec. 7, 1961, 881,216
6 Claims. (Cl. 263—21)

This invention relates to methods of effecting heat exchange and to heat transfer devices therefor, especially for the heating or cooling of material in the form of discrete particles.

Screw conveyor heat transfer devices are known comprising a casing, having a material inlet at or near one end thereof and a material outlet at or near the other end thereof, and two or more hollow screw conveyor flights mounted on parallel shafts in the casing, the flights interfolding or overlapping to cause as much of the material as possible to come into contact with or close proximity to the flight surfaces by their stirring action, the flight surfaces being heated or cooled by a heating or cooling fluid passed through the hollow flights, and if desired through the shafts. Such a device is for example described in the specification of British Patent No. 737,118. This device can be constructed to obtain quite effective contact between the flights and the material by causing the flights to interfold over a considerable proportion of the radial dimension of each flight, and by shaping the casing approximately to the envelope generated by the peripheries of the interfolded screw conveyors when in motion so as to reduce the space within the casing, in the region of the interfolds of the flights, so that less particles are able to occupy an interfold space and thereby avoid the stirring action of the interfolded screw conveyors. However certain materials in the form of particles are not normally very fluid, and considerable power is needed to rotate the conveyor screws.

According to the present invention a material in the form of discrete particles is subjected to a fluidizing action by injecting a fluid directly into it, and simultaneously the particles are subjected to heat exchange contact with a heat exchange surface, and also simultaneously agitated and conveyed along a treatment chamber.

Also according to the invention, there is provided a heat transfer device comprising a casing having an inlet for a material in the form of a mass of particles at or near one end thereof, and a material outlet at or near the other end thereof, at least one screw conveyor flight mounted in said casing, and at least one porous membrane in the bottom of the casing, said porous membrane being adapted to be connected to a pump in such a manner that fluid may be pumped through the membrane into the casing whereby fluidization of the mass of discrete particles may be effected.

The term "porous" used herein is intended to include perforated and/or porous, i.e., adapted to permit passage of air or other gas therethrough.

The heat transfer device may comprise at least two screw conveyor flights mounted on horizontal or nearly horizontal shafts in said casing in such a manner that adjacent flights interfold one with another and said porous membrane may be located at the bottom of the casing beneath at least the interfold space or spaces.

The flight or flights and/or the shaft or shafts may be hollow for passage therethrough of heat exchange medium such as brine or steam.

Figure 2:
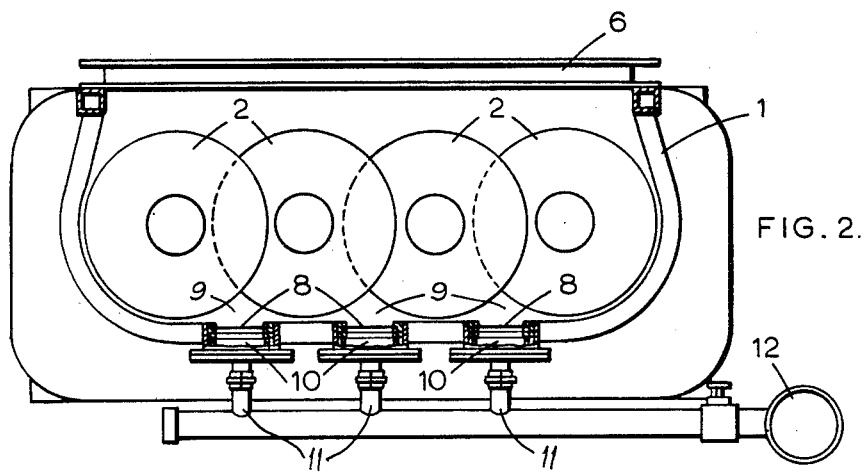

The invention will now be described, by way of example, with reference to the accompanying drawings wherein:

FIGURE 1 shows a partly cut away side elevational view of a heat transfer device designed in accordance with the invention; and FIGURE 2 shows a sectional view along the line 2—2 FIGURE 1, but with only the peripheries of the screw conveyors shown diagrammatically.

A casing 1 is constructed as a treatment chamber in the form of a flat-bottomed steel trough. Four hollow conveyor screw flights 2 are mounted on horizontal hollow shafts 3 within the casing, adjacent flights 2 interfolding with or overlapping one another. The hollow flights 2 and the shafts 3 are provided with a heating or cooling fluid inlet 4 and outlet 5, which are to be connected to fluid supply means (not shown) supplying or removing heat for operation of the device. The shafts are mounted in bearings 15, 16 for rotation. The casing 1 is provided near one end with an inlet 6 for material in the form of a mass of particles to be heated or cooled, and a material outlet 7 near the other end.

At the bottom of the trough casing 1 there are four openings covered by four groups of porous membranes 8 made of ceramics, perforated stainless steel or other suitable material, each group having three membranes arranged one beneath each of the interfold spaces 9 formed by the conveyor screw flights 2. The porous membranes 8 in each group are mounted above chambers 10 interconnected by means of pipes 11. In this embodiment the groups of membranes are each supplied by a common air supply pipe 12 leading to an air pump (not shown).

In operation, the screw conveyor flights 2 and the shafts 3 are supplied with heating or cooling fluid as desired, and the shafts 3 are all rotated synchronously by means not shown, so as to convey the material, which has been introduced into the casing 1 through the inlet 6, towards the outlet 7.

As the material passes over the porous membranes 8, which are being supplied with air through the pipes 11 and 12, it is fluidized. This has the two-fold effect of firstly causing most of the material by a tumbling action to come into contact with or close proximity to the flights 2 or shafts 3, so that the heating or cooling is more even, and secondly making the material easier to convey, so that, for a given rate of flow of material, less power is required to drive the screw conveyors.

Also, the tumbling action in the interfold spaces 9 renders it unnecessary for the casing to correspond closely to the envelope generated by the peripheries of the screw conveyors for the purpose of reducing the interfold space. Hence a more simply shaped, and hence cheaper and perhaps stronger casing is possible.

In the embodiment shown, the groups of porous membranes 8 are arranged to produce a continuous current of air along each interfold space 9. It would be feasible to provide the groups of membranes 8 at intervals in such a manner as to form alternately still and turbulent regions respectively between and above the membranes.

If the fluid through the flights 2 and shafts 3 is hot, so as to heat the material, the air through the membranes 8 may advantageously also be hot. Conversely, if said fluid is cold, then the air may also be cooled.

If it is required to vary the rate of flow and/or the temperature of the air through successive groups of membranes, then pipe 12 can be omitted and each pipe 11 connected to its own air supply means and/or its own heating or cooling means, according as the case may require.

It is also possible to have any other number of screw conveyors, and to provide one less porous membrane in each group than the number of screw conveyors, or even to provide only one porous membrane, extending the whole width of the casing in each group.

The number of groups of membranes in a device will depend on the length of the screw conveyors and upon such factors as the desired rate of flow and temperature of the air at various points along the device.

The air injected by the porous plates inside the pulverulent matter fluidizes the latter, gives to it the characteristics of a liquid, and maintains it in efficient contact with the heat exchanging surface. The sinking which usually takes place inside the heat exchangers is thus avoided.

The material is then much more efficiently mixed by the screws and the heat exchange is improved and quickened.

Examples of Application of the Process (a) *Cooling.*—Some cold air may be injected into the material, which will have the sole effect of improving the heating transmission co-efficient. This is a particularly important application of the invention especially for cooling gypsum. It has heretofore been found that cooling hot calcined gypsum with air tends to cause setting of the gypsum. The present invention has the unforeseen advantage that gypsum can be cooled without deterioration preferably by using dried air for fluidization and effecting cooling with interleaved internally cooled hollow screws.

(b) *Drying.*—Some hot air may be injected into the material, which will ensure the fluidization of the material and will assist in carrying away the steam coming from the drying operation.

(c) *Treatments of the product.*—The porous elements can be used to inject inside the matter the gases or the steam which may be required during a treatment of the product.

Advantages of the Process (a) *Improvements of the exchange co-efficients.*—Everything being otherwise equal, the fluidization provides increases by up to 30 percent the value of the transmission co-efficients.

(b) *The direct consequence of the improvement of the transmission co-efficients* is the reduction of the investment expenses. For a given calorific value, the price of the unit is in direct relation with the required exchange surface, and consequently, with the colorific transmission co-efficients.

(c) *Diminution of the motive power used* for rotating the screws. The mechanical mixing of a fluidized material necessitates less power than that required for the mixing of a compact material.

(d) *Reduction of wear and abrasion* due to the reduction of the apparent density of the fluidized material and the consequent reduction in friction between the material and the heat transfer device.

It is to be understood that the term "air" is intended to include any suitable gas or vapor which it may be desired to use instead of air for a given purpose, and "fluid" is intended to include liquid.

The invention may advantageously be used for the treatment of gypsum in the form of finely divided power, e.g. of such fineness that 80 percent is capable of passing through a 200 mesh British Standard screen. The gypsum as it passes through the chamber is indirectly heated and simultaneously air or other gas is blown into the gypsum to fluidise it and to remove moisture from it and the moisture laden air is continuously removed from the chamber.

I claim:

1. A method of treating gypsum comprising passing gypsum in the form of a finely divided powder through a treatment chamber by contacting with at least two moving screw-shaped heating surfaces that overlap each other radially and simultaneously heating the gypsum while propelling said gypsum through the chamber, and simultaneously blowing gas into the lower part of the gypsum in said chamber to fluidize the gypsum between said moving surfaces and simultaneously remove moisture therefrom, and continuously removing the moisture-laden gas from said chamber.

2. A method of treating a material, comprising conveying the material along a chamber by a hollow heat exchange screw device, circulating heat exchange medium through said screw device, subjecting the material to a fluidizing action by injecting a fluid directly into it, whereby the particles are simultaneously subjected in the chamber between the helices of said screw device along the chamber to heat exchange contact with the heat exchange surfaces of the screw device, agitated by said device and conveyed by said device along the treatment chamber.

3. A method of treating gypsum comprising calcining gypsum in the form of a powder, passing the hot gypsum through a chamber in contact with at least two moving cooling screw-shaped surfaces which overlap each other radially and which simultaneously cool the gypsum and propel it through said chamber, projecting cool gas into the bottom part of the gypsum so as to fluidize the gypsum between the moving surfaces and continuously removing the gas from the chamber.

4. A heat transfer device comprising a material treatment chamber, at least two rotary screw devices within the treatment chamber to convey material in the form of discrete particles along said chamber, said screws having their flights overlapping each other radially, and means to fluidize the material passing through the chamber by injecting a fluid directly into said material and means for controlling the temperature of the screw devices whereby heat exchange is effected between the latter and said material.

5. A heat transfer device comprising a material treatment chamber in the form of a casing having an inlet for the material substantially at one end thereof and a material outlet substantially at the other end thereof, at least two screw conveyor flights mounted for rotation within the casing, each flight overlapping the adjacent flight radially, a pump, at least one porous membrane mounted in the bottom of the casing, means connecting the porous membrane to the pump so that fluid may be pumped through the membrane into the casing whereby fluidization of the material in said casing may be effected, and means for introducing heat exchange medium into said flights.

6. A heat transfer device comprising a material treatment chamber in the form of a casing, at least two screw conveyor flights mounted for rotation on approximately horizontal axes within the casing in such a manner that the flights interfold, said flights being hollow, means for circulating a heat exchange medium within the flights whereby the flights act as a heat exchange surface, a pump, a porous membrane located beneath at least the interfold space of the flights, and means connecting the porous membrane to the pumps so that fluid may be pumped through the membrane into the casing whereby fluidization of the material in said casing may be effected.

References Cited in the file of this patent

UNITED STATES PATENTS

| | | |
|---|---|---|
| 1,798,857 | Tyler | Mar. 31, 1931 |
| 2,462,366 | Davies, et al. | Feb. 22, 1949 |
| 2,767,972 | Badger | Oct. 23, 1956 |
| 2,788,960 | Skinner et al. | Apr. 16, 1957 |
| 3,022,988 | Corson et al. | Feb. 27, 1962 |